United States Patent
Fuchs

(10) Patent No.: US 9,744,684 B2
(45) Date of Patent: Aug. 29, 2017

(54) MACHINE TOOL SEPARATING DEVICE

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 429 days.

(21) Appl. No.: 14/002,653

(22) PCT Filed: Mar. 2, 2012

(86) PCT No.: PCT/EP2012/000951
§ 371 (c)(1),
(2), (4) Date: Nov. 13, 2013

(87) PCT Pub. No.: WO2012/116839
PCT Pub. Date: Sep. 7, 2012

(65) Prior Publication Data
US 2014/0123504 A1    May 8, 2014

(30) Foreign Application Priority Data
Mar. 3, 2011 (DE) .......................... 10 2011 005 008

(51) Int. Cl.
*B27B 17/02* (2006.01)
*B23D 57/02* (2006.01)
*B27B 33/14* (2006.01)

(52) U.S. Cl.
CPC ............ *B27B 17/02* (2013.01); *B23D 57/023* (2013.01); *B27B 33/14* (2013.01)

(58) Field of Classification Search
CPC ..... B27B 17/0083; B27B 33/14; B27B 17/02; B23D 57/023
USPC ............................ 30/373, 374, 382, 122, 386
See application file for complete search history.

(56) References Cited

U.S. PATENT DOCUMENTS

| | | | |
|---|---|---|---|
| 3,910,147 A | | 10/1975 | Heyerdahl |
| 4,807,366 A | | 2/1989 | Masato et al. |
| 4,901,613 A | * | 2/1990 | Carlton .......................... 83/830 |
| 5,669,145 A | * | 9/1997 | Skripsky ............. B27B 17/0083 30/371 |
| 6,408,730 B1 | * | 6/2002 | Tinner et al. ................... 83/832 |
| 8,069,575 B2 | * | 12/2011 | Stones et al. ................... 30/378 |
| 2004/0049925 A1 | | 3/2004 | Verges et al. |

FOREIGN PATENT DOCUMENTS

| | | |
|---|---|---|
| AT | 384 389 B | 11/1987 |
| CH | 221 661 | 6/1942 |
| CN | 1553847 A | 12/2004 |
| CN | 1779291 A | 5/2006 |
| CN | 2936638 Y | 8/2007 |
| DE | 102 58 605 A1 | 7/2004 |

(Continued)

OTHER PUBLICATIONS

International Search Report corresponding to PCT Application No. PCT/EP2012/000951, mailed Jul. 9, 2012 (German and English language document) (5 pages).

*Primary Examiner* — Omar Flores Sanchez
(74) *Attorney, Agent, or Firm* — Maginot, Moore & Beck LLP

(57) ABSTRACT

A machine tool separating device, in particular a handheld machine separating device, includes at least one cutting strand and at least one guide unit. The cutting strand, viewed along a direction running at least substantially perpendicular to a cutting plane of the cutting strand, has a maximum dimension less than 4 mm.

20 Claims, 3 Drawing Sheets

(56) References Cited

FOREIGN PATENT DOCUMENTS

| | | |
|---|---|---|
| DE | 10 2006 062 001 A1 | 3/2008 |
| EP | 1 397 955 A2 | 3/2004 |
| JP | 7-214505 A | 8/1995 |
| SU | 1139624 A1 | 2/1985 |

* cited by examiner

MACHINE TOOL SEPARATING DEVICE

This application is a 35 U.S.C. §371 National Stage Application of PCT/EP2012/000951, filed on Mar. 2, 2012, which claims the benefit of priority to Serial No. DE 10 2011 005 008.6, filed on Mar. 3, 2011 in Germany, the disclosures of which are incorporated herein by reference in their entirety.

BACKGROUND

Machine tool separating devices are already known which comprise a cutting strand and a guide unit.

SUMMARY

The disclosure proceeds from a machine tool separating device, in particular from a manual machine tool separating device, having at least one cutting strand and having at least one guide unit.

It is proposed that the cutting strand, as seen along a direction running at least substantially perpendicular to a cutting plane of the cutting strand, has a maximum dimension smaller than 4 mm. The dimension is preferably formed as the width of the cutting strand. The cutting strand, as seen along the direction running at least substantially perpendicular to the cutting plane of the cutting strand, particularly preferably has along an entire length of the cutting strand an at least substantially identical maximum dimension. The maximum dimension preferably corresponds along the entire length of the cutting strand to a value from a value range from 1 mm to 3 mm. As a result, the machine tool separating device, as seen along a total extension of the machine tool separating device, has a total width which is smaller than 4 mm. The cutting strand is thus preferably provided in order to generate a cutting gap which, as seen along the direction running at least substantially perpendicular to the cutting plane of the cutting strand, has a maximum dimension smaller than 4 mm. A "cutting strand" here is supposed to refer in particular to a unit which is provided in order to locally increase an atomic cohesion of a workpiece to be machined, in particular by means of a mechanical cutting off and/or by means of a mechanical removal of material particles of the workpiece. The cutting strand is preferably provided in order to separate the workpiece into at least two physically separate parts and/or at least partially cut off and/or remove material particles of the workpiece starting from one surface of the workpiece. The cutting strand is particularly preferably formed as a continuous cutting strand, in particular as a cutting chain, which can be driven rotationally and/or in an oscillating manner along a circumference of the guide unit.

A "guide unit" here is supposed to refer in particular to a unit which is provided in order to exert a constraining force on the cutting strand at least along a direction perpendicular to a cutting direction of the cutting strand in order to define a possible movement of the cutting strand along the cutting direction. In this context, "provided" is supposed to refer to in particular specially designed and/or specially equipped. The guide unit preferably has at least one guide element, in particular a guide groove, through which the cutting strand is guided. The cutting strand, as seen in a cutting plane, is preferably guided along an entire circumference of the guide unit through the guide unit by means of the guide element, in particular the guide groove. The cutting strand and the guide unit particularly preferably form a closed system. The guide unit preferably has a geometric configuration which, as seen in the cutting plane, has a self-contained outer contour which comprises at least two straight lines which run parallel to one another and at least two connecting portions, in particular circular arcs, which connect in each case ends, which face one another, of the straight lines to one another. The term "closed system" here is supposed to define in particular a system which comprises at least two components which retain a functionality and/or are permanently connected to one another in the disassembled state by means of an interaction in a disassembled state of the system by a system superordinate to said system, such as, for example, a machine tool. The at least two components of the closed system for an operator are preferably connected to one another at least substantially undetachably. The term "at least substantially undetachably" here is supposed to refer in particular to a connection of at least two components which can only be separated from one another with the assistance of separating tools, such as, for example, a saw, in particular, a mechanical saw, etc., and/or chemical separating means such as, for example, solvents, etc.

The term "cutting plane" here is supposed to define in particular a plane in which the cutting strand is moved in at least one operating state along a circumference of the guide unit in at least two opposing cutting directions relative to the guide unit. During machining of a workpiece, the cutting plane is preferably aligned at least substantially transverse to a workpiece surface being machined. "At least substantially transverse" here is supposed to refer in particular to an alignment of a plane and/or a direction relative to a further plane and/or a further direction which preferably deviates from a parallel alignment of the plane and/or the direction relative to the further plane and/or the further direction. It is, however, also conceivable that, during machining of a workpiece, the cutting plane is aligned at least substantially parallel to a workpiece surface to be machined, in particular in the case of a formation of the cutting strand as a grinding means, etc. The term "at least substantially parallel" here is supposed to refer in particular to an alignment of a direction relative to a reference direction, in particular in a plane, wherein the direction relative to the reference direction has a deviation in particular of less than 8°, advantageously less than 5° and particularly advantageously less than 2°. The term "at least substantially perpendicular" here is supposed to define in particular an alignment of a direction relative to a reference direction, wherein the direction and the reference direction, in particular as seen in a plane, enclose an angle of 90° and the angle has a maximum deviation in particular of less than 8°, advantageously less than 5° and particularly advantageously less than 2°. A "cutting direction" here is supposed to refer to in particular a direction along which the cutting strand is moved to produce a cutting gap and/or for cutting off and/or removing material particles of a workpiece to be machined in at least one operating state as a result of a driving force and/or of a driving torque, in particular in the guide unit. In one operating state, the cutting strand is preferably moved along the cutting direction relative to the guide unit. Cutting gaps with small dimensions can be generated particularly advantageously by means of the configuration according to the disclosure of the machine tool separating device. Moreover, a high cut in the event of a fragmentation of workpieces can advantageously be prevented by means of the small dimension of the generated cutting gap.

Cutting gaps with small dimensions can particularly advantageously be generated by virtue of the fact that the cutting strand, as seen along the direction running at least substantially perpendicular to the cutting plane of the cutting strand, has a maximum dimension between 1.3 mm and 2.2 mm. The cutting gap is thus preferably provided in order to generate a cutting gap which, as seen along the direction running at least substantially perpendicular to the cutting plane of the cutting strand, has a maximum dimension between 1.3 mm and 2.2 mm. It is, however, also conceivable that the cutting strand, as seen along the direction running at least substantially perpendicular to the cutting plane of the cutting strand, has a maximum dimension which is smaller than 1.3 mm.

It is furthermore proposed that the guide unit together with the mounted cutting strand, as seen along a direction running at least substantially parallel to the cutting plane of the cutting strand and at least substantially perpendicular to a main extension direction of the guide unit, has a maximum dimension of less than 50 mm. Preferably, the guide unit together with the mounted cutting strand, as seen along the direction running at least substantially parallel to the cutting plane of the cutting strand and at least substantially perpendicular to the main extension direction of the guide unit, has a dimension of less than 30 mm, particularly preferably of less than 25 mm. The dimension is preferably formed as the total height of the guide unit together with the cutting strand mounted on the guide unit. The machine tool separating device particularly preferably has a total height along an entire extension of the machine tool separating device with a value from a value range from 5 mm to 40 mm. The cutting strand is thus preferably provided in order to generate a cutting gap which, as seen along a direction running at least substantially parallel to the cutting plane of the cutting strand and at least substantially perpendicular to the main extension direction of the cutting strand, has a maximum dimension of less than 50 mm. The cutting strand is preferably provided in order to generate a cutting gap which, as seen along the direction running at least substantially parallel to the cutting plane of the cutting strand and at least substantially perpendicular to the main extension direction of the guide unit together with the mounted cutting strand, has a dimension of between 10 mm and 30 mm and particularly preferably a dimension of between 11 and 25 mm. The term "main extension direction" here is supposed to refer in particular to a direction along which the guide unit together with the mounted cutting strand has a maximum extension. The main extension direction particularly preferably runs at least substantially parallel to the straight lines of the outer contour of the guide unit. A power requirement of a machine tool for driving the machine tool separating device according to the disclosure is in particular dependent on a cutting gap which can be generated by means of the machine tool separating device according to the disclosure. A machine tool with a low power requirement can thus advantageously be used to drive the machine tool separating device according to the disclosure.

It is furthermore proposed that the cutting strand has at least one cutting element which, in a mounted state, extends at least along a direction running at least substantially perpendicular to the cutting plane of the cutting strand less than 0.2 mm beyond at least one outer surface of the guide unit. The term "outer surface" here is supposed to refer in particular to a surface which spatially delimits the guide unit. The outer surface preferably runs at least substantially parallel to the cutting plane of the cutting strand. A compact machine tool separating device can be advantageously achieved.

The cutting element advantageously ends at least substantially flush with at least one outer surface of the guide unit in a mounted state along the direction running at least substantially perpendicular to the cutting plane of the cutting strand. The term "end at least substantially flush" here is supposed to refer in particular to an arrangement of the cutting element, in particular in a mounted state in and/or on the guide unit, relative to the guide unit in the case of which the cutting element, as seen along a direction running at least substantially perpendicular to the cutting plane, has a dimension which extends to its maximum up to an outer surface of the guide unit and extends in particular within a dimension of the guide unit, as seen along a direction running at least substantially perpendicular to the cutting plane. A cutting gap can advantageously be generated during the bearing of the outer surface of the guide unit on a base in a workpiece aligned transverse to the base.

The cutting strand preferably has at least three blade carrier elements which can be connected to one another in an articulated manner by means of at least two connecting elements of the cutting strand, which connecting elements have a relative distance to one another along a cutting direction of the cutting strand which is smaller than 5 mm, relative to the central axes of the connecting elements. The connecting elements preferably have a relative distance to one another along the cutting direction of the cutting strand which is smaller than 4 mm and particularly preferably smaller than 3 mm. The term "blade carrier element" here is supposed to refer in particular to an element on which at least one cutting element for cutting off and/or for removal of material particles of a workpiece to be machined is fixed. The term "connecting element" here is supposed to define in particular an element which is provided in order to connect at least two components in a positive-locking manner and/or non-positive locking manner, to connect them in particularly movably to one another in order to transmit a driving force and/or a driving torque. The connecting element is preferably formed bolt-shaped. The connecting element is particularly preferably formed in one piece with a blade carrier element. The term "in one piece" here is supposed to be understood in particular as at least adhesively connected, for example, by a welding process, a gluing process, a spraying process and/or another process which seems to be expedient to the person skilled in the art, and/or advantageously as formed in one piece, such as, for example, by production from a cast and/or by production in a one- or multi-component spraying process and advantageously from an individual blank. A compact arrangement of blade carrier elements relative to one another can be advantageously achieved.

It is furthermore proposed that the machine tool separating device has a total mass which is less than 500 g. The machine tool separating device preferably has a total mass which is less than 100 g and particularly preferably less than 50 g. A lightweight machine tool separating device can advantageously be achieved which it is easy for an operator to handle.

The disclosure furthermore proceeds from a portable machine tool system having a coupling device for positive-locking and/or non-positive-locking coupling to a machine tool separating device according to the disclosure. A "portable machine tool" here is supposed to refer in particular to a machine tool, in particular a manual machine tool which can be transported by an operator without a transport machine. The portable machine tool has in particular a mass which is less than 40 kg, preferably less than 10 kg and particularly preferably less than 5 kg. The machine tool separating device according to the disclosure and the portable machine tool according to the disclosure particularly preferably form a machine tool system. A portable machine tool can advantageously be achieved which can be used in a plurality of applications for machining of workpieces.

It is furthermore proposed that the portable machine tool comprises at least one drive unit which is provided in order to drive the cutting strand in at least one operating state with a cutting speed of less than 6 m/s, in particular along the cutting direction of the cutting strand. The drive unit is preferably provided in order to drive the cutting strand with a cutting speed of less than 5 m/s and particularly preferably with a cutting speed of less than 4 m/s. A service life of the cutting strand can advantageously be positively influenced by means of a low cutting speed.

The machine tool separating device according to the disclosure and/or the portable machine tool according to the disclosure should in this case not be restricted to the use and embodiment described above. In particular, the machine tool separating device according to the disclosure and/or the portable machine tool according to the disclosure can have a number which differs from a number cited herein of individual elements, components and units in order to fulfill a mode of operation described herein.

BRIEF DESCRIPTION OF THE DRAWINGS

Further advantages will become apparent from the following description of the drawing. An exemplary embodiment of the disclosure is shown in the drawing. The drawing, the description and the claims contain numerous features in combination. The person skilled in the art will also appropriately consider the features individually and combine them to form expedient further combinations.

In the drawing.

DETAILED DESCRIPTION

Figure 1:
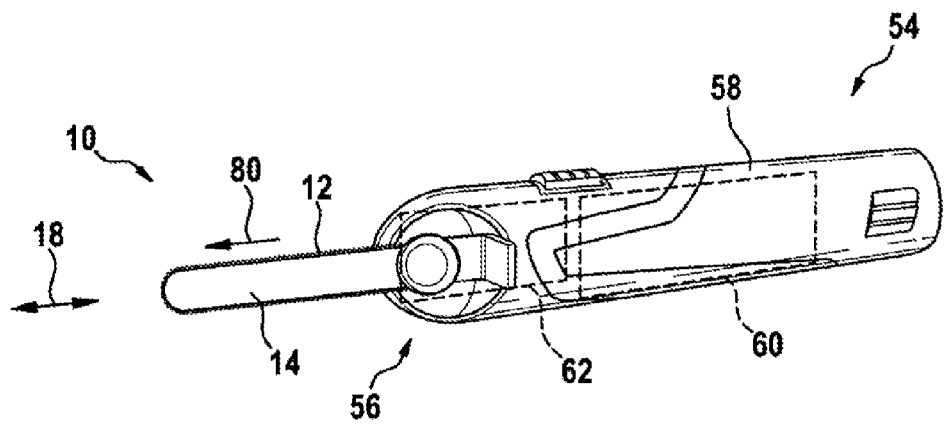
FIG. 1 shows a portable machine tool according to the disclosure having a machine tool separating device according to the disclosure in a schematic representation.

FIG. 1 shows a portable machine tool 54 with a machine tool separating device 10 which jointly form a machine tool system. Portable machine tool 54 has a coupling device 56 for positive-locking and/or non-positive-locking coupling to machine tool separating device 10. Coupling device 56 can in this case be formed as a bayonet joint and/or as a different coupling device which seems to be expedient to a person skilled in the art. Portable machine tool 54 furthermore has a machine tool housing 58 which encloses a drive unit 60 and a transmission unit 62 of portable machine tool 54. Drive unit 60 and transmission unit 62 are effectively connected to one another in a manner already known to a person skilled in the art for the generation of a driving torque which can be transmitted to machine tool separating device 10. Transmission unit 62 is formed as an angular transmission. Drive unit 60 is formed as an electric motor unit. It is, however, also conceivable that drive unit 60 and/or transmission unit 62 have a different configuration which seems to be expedient to a person skilled in the art. Drive unit 60 is provided in order to drive cutting strand 12 of machine tool separating device 10 in at least one operating state with a cutting speed lower than 6 m/s. In this case, portable machine tool 54 has at least one operating mode in which driving of cutting strand 12 in a guide unit 14 of machine tool separating device 10 along a cutting direction 80 of cutting strand 12 with a cutting speed of lower than 6 m/s is enabled.

Figure 2:
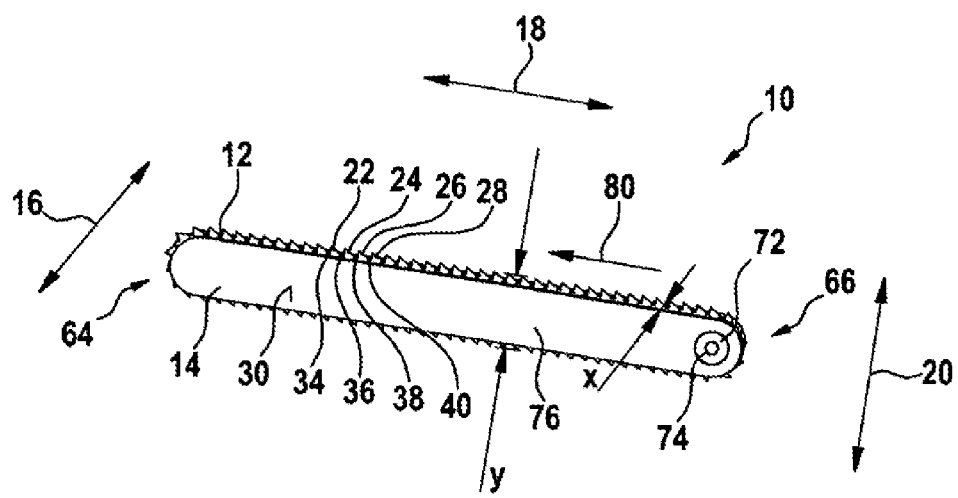
FIG. 2 shows a detailed view of the machine tool separating device according to the disclosure in a schematic representation.

FIG. 2 shows machine tool separating device 10 in an uncoupled state from coupling device 56 of portable machine tool 54. Machine tool separating device 10 has cutting strand 12 and guide unit 14. Cutting strand 12 and the guide unit jointly form a closed system. Guide unit 14 is formed here as a blade. A torque transmission element 72 of machine tool separating device 10 for driving of cutting strand 12 is mounted in guide unit 14. In this case, torque transmission element 72, as seen along a direction perpendicular to a cutting plane of cutting strand 12, is arranged partially between two outer walls 76, 78 of guide unit 14 (only one of two outer walls 76, 78 can be seen in FIG. 2). Torque transmission element 72 can be connected to transmission unit 62 and/or drive unit 60 for the transmission of forces and/or torques to cutting strand 12 by means of coupling device 56. To this end, torque transmission element 72 has a recess 74 into which a pinion of drive unit 60 and/or a gear wheel and/or a toothed shaft of transmission unit 62 engages in a mounted state. Recess 74 is arranged concentrically in torque transmission element 72. Torque transmission element 72 is furthermore formed as a gear wheel. The gear wheel has a diameter which is smaller than 8 mm. In an alternative configuration, not shown here, torque transmission device 72 has a diameter which is smaller than 15 mm.

Guide unit 14, as seen in the cutting plane of cutting strand 12, furthermore has at least two convexly formed ends 64, 66. Convexly formed ends 64, 66 of guide unit 14 are arranged on two sides of guide unit 14 which face away from one another. Cutting strand 12 is guided by means of guide unit 14. To this end, guide unit 14 has at least one guide element 68 (FIG. 4) by means of which cutting strand 12 is guided. Guide element 68 is formed as a guide groove 70 (FIG. 4) which extends in a cutting plane of cutting strand 12 along an entire circumference of guide unit 14. In this case, cutting strand 12 is guided by means of edge regions of guide unit 14 which delimit guide groove 70. It is, however, also conceivable that guide element 68 is formed in a different manner which seems to be expedient to a person skilled in the art, such as, for example, as a rib-like formation on guide unit 14 which engages in a recess on cutting strand 12. Cutting strand 12 is, as seen in a plane running perpendicular to the cutting plane, surrounded by three sides of the edge regions which delimit guide groove 70. Cutting strand 12 is moved during an operation rotationally along the circumference in guide groove 70 relative to guide unit 14.

Cutting strand 12 has, as seen along a direction 16 running at least substantially perpendicular to the cutting plane of cutting strand 12, along a total length of the cutting strand a maximum dimension x of 1.3 mm. Machine tool separating device 10 thus has a total width of 1.3 mm. In an alternative configuration of machine tool separating device 10, not shown in greater detail here, cutting strand 12 has, as seen along direction 16 running at least substantially perpendicular to the cutting plane of cutting strand 12, along a total length of the cutting strand a maximum dimension x of 2.2 mm. Machine tool separating device 10 thus has a total width of 2.2 mm in the alternative configuration. It is, however, also conceivable that cutting strand 12 has, as seen along direction 16 running at least substantially perpendicular to the cutting plane of cutting strand 12, a dimension which deviates from 1.3 mm and/or from 2.2 mm and has a value between 1 mm and 3 mm.

Guide unit 14 furthermore have together with mounted cutting strand 12, as seen along a direction 20 running at least substantially parallel to the cutting plane of cutting strand 12 and at least substantially perpendicular to a main extension direction 18 of guide unit 14 together with mounted cutting strand 12, along a total extension of guide unit 14 together with mounted cutting strand 12 a dimension y which is smaller than 15 mm. Machine tool separating device 10 thus has along a total extension of machine tool separating device 10 a maximum total height which is less than 15 mm. In an alternative configuration of machine tool separating device 10 not shown in greater detail here, guide unit 14 has together with mounted cutting strand 12, as seen along direction 20 running at least substantially parallel to the cutting plane of cutting strand 12 and at least substantially perpendicular to main extension direction 18 of guide unit 14 together with mounted cutting strand 12, along a total extension of guide unit 14 together with mounted cutting strand 12 a maximum dimension y which is smaller than 25 mm. In the alternative configuration along a total extension of machine tool separating device 10, machine tool separating device 10 has a maximum total height which is less than 25 mm. It is, however, also conceivable that guide unit 14 has together with mounted cutting strand 12, as seen along direction 20 running at least substantially parallel to the cutting plane of cutting strand 12 and at least substantially perpendicular to main extension direction of guide unit 14 together with mounted cutting strand 12, a dimension y which deviates from 15 mm and/or from 25 mm and has a value between 5 mm and 40 mm.

Machine tool separating device 10 furthermore has a total length, as seen along main extension direction 18, which is less than 220 mm. The total length of machine tool separating device 10 is formed by an extension of guide unit 14 and cutting strand 12 mounted on guide unit 14 along main extension direction 18. Machine tool separating device 10 furthermore has a total mass which is smaller than 500 g. The total mass of machine tool separating device 10 is composed of an individual mass of guide unit 14, an individual mass of cutting strand 12 mounted on guide unit 14 and an individual mass of torque transmission element 72 mounted in guide unit 14.

Figure 3:
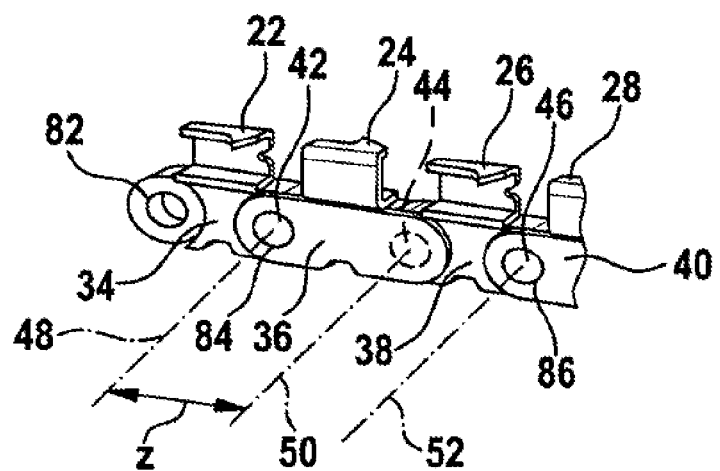
FIG. 3 shows a detailed view of blade carrier elements of the machine tool separating device according to the disclosure in a schematic representation.
Figure 4:
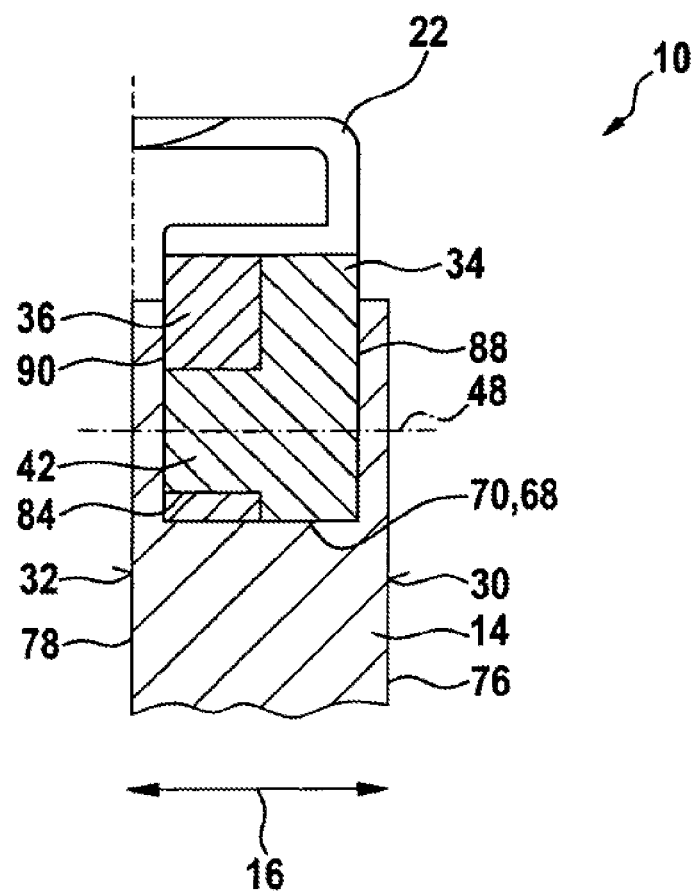
FIG. 4 shows a detailed view of an arrangement of the blade carrier elements in a guide unit of the machine tool separating device according to the disclosure in a schematic representation.

FIG. 3 shows a detailed view of blade carrier elements 34, 36, 38, 40 of cutting strand 12 of machine tool separating device 10. Cutting strand 12 has at least three blade carrier elements 34, 36, 38, 40 which are connected to one another in an articulated manner by means of at least two connecting elements 42, 44, 46 of cutting strand 12. Connecting elements 42, 44, 46 have along a cutting direction 80 of cutting strand 12 a relative distance z to one another which is smaller than 5 mm with respect to central axes 48, 50, 52 of connecting elements 42, 44, 46. Connecting elements 42, 44, 46 are formed bolt-shaped. It is, however, also conceivable that connecting elements 42, 44, 46 have a different configuration which seems to be expedient to a person skilled in the art. Connecting elements 42, 44, 46 are furthermore respectively formed in one piece with one of blade carrier elements 34, 36, 38, 40. It is, however, also conceivable that connecting elements 42, 44, 46 are formed separately from blade carrier elements 34, 36, 38, 40. In total, cutting strand 12 has a plurality of blade carrier elements 34, 36, 38, 40 which are connected to one another in each case by means of one of connecting elements 42, 44, 46. A person skilled in the art will select a suitable number of blade carrier elements 34, 36, 38, 40 for cutting strand 12 depending on the application. Blade carrier elements 34, 36, 38, 40 furthermore have in each case a connecting recess 82, 84, 86 for receiving in each case one of connecting elements 42, 44, 46 in a mounted state. Connecting elements 42, 44, 46 are guided by means of guide unit 14 (FIG. 4). In this case, connecting elements 42, 44, 46 are arranged in guide groove 70 in a mounted state of cutting strand 12. Connecting elements 42, 44, 46 can, as seen in a plane running perpendicular to the cutting plane, be supported on two side walls 88, 90 of guide groove 70. Side walls 88, 90 of guide groove 70 extend, as seen in the cutting plane, to the outside from guide unit 14 perpendicular to cutting direction 80 of cutting strand 12.

Figure 5:
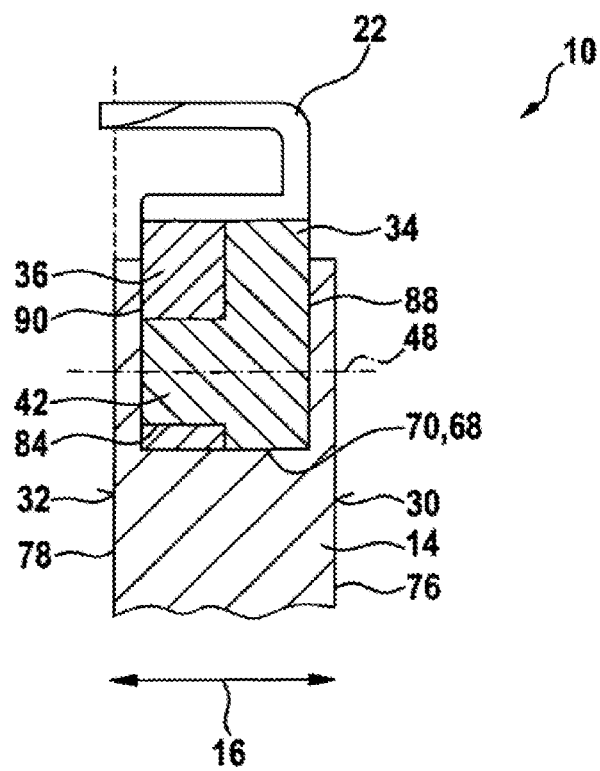
FIG. 5 shows a detailed view of another arrangement of the blade carrier elements in a guide unit of the machine tool separating device according to the disclosure in a schematic representation.
Figure 6:
FIG. 6 shows a schematic representation of separating tools.

FIG. 4 shows a detailed view of an arrangement of blade carrier elements 34, 36, 38, 40 in guide groove 70 of guide unit 14 of machine tool separating device 10. Cutting strand 12 has cutting elements 22, 24, 26, 28 which extend in each case in a mounted state along direction 16 running at least substantially perpendicular to the cutting plane of cutting strand 12 less than 0.2 mm beyond an outer surface 30, 32 of guide unit 14. Cutting elements 22, 24, 26, 28 end in each case in a mounted state along direction 16 running at least substantially perpendicular to the cutting plane of cutting strand 12 at least substantially flush with one of outer surfaces 30, 32 of guide unit 14. In an alternative configuration of machine tool separating device 10 shown in FIG. 5, cutting elements 22, 24, 26, 28 end in each case in a mounted state along direction 16 running at least substantially perpendicular to the cutting plane of cutting strand 12 at least substantially flush with one of outer surfaces 30, 32 of guide unit 14 and cutting elements 22, 24, 26, 28 extend in each case in a mounted state along direction 16 running at least substantially perpendicular to the cutting plane of cutting strand 12 less than 0.2 mm beyond one of outer surfaces 30, 32.

A number of cutting elements 22, 24, 26, 28 is dependent on a number of blade carrier elements 34, 36, 38, 40. A person skilled in the art will select a suitable number of cutting elements 22, 24, 26, 28 depending on the number of blade carrier elements 34, 36, 38, 40. Cutting elements 22, 24, 26, 28 are formed in each case in one piece with one of blade carrier elements 34, 36, 38, 40. Cutting elements 22, 24, 26, 28 are furthermore provided in order to enable a cutting off and/or a removal of material particles of a workpiece to be machined (not shown in greater detail here). Cutting elements 22, 24, 26, 28 can be formed, for example, as full chisels, half chisels or other types of blade which seem to be expedient to a person skilled in the art which are provided to enable a cutting off and/or a removal of material particles of a workpiece to be machined. Cutting strand 12 is formed continuously. Cutting strand 12 is thus formed as a cutting chain. Blade carrier elements 34, 36, 38, 40 are formed in this case as chain links which are connected to one another by means of bolt-shaped connecting elements 42, 44, 46. It is, however, also conceivable that cutting strand 12, blade carrier elements 34, 36, 38, 40 and/or connecting elements 42, 44, 46 are configured in a different manner which seems to be expedient to a person skilled in the art.

The invention claimed is:

1. A machine tool separating device, comprising:
   at least one cutting strand; and
   at least one guide unit configured to guide the at least one cutting strand,
   wherein the cutting strand, as seen along a direction running at least substantially perpendicular to a cutting plane of the cutting strand, has a maximum dimension smaller than 4 mm, and
   wherein the cutting strand has at least one cutting element which, in a mounted state, extends at least substantially along the direction running at least substantially perpendicular to the cutting plane of the cutting strand less than 0.2 mm beyond at least one outer surface of the guide unit.

2. The machine tool separating device as claimed in claim 1, wherein the cutting strand and the guide unit are configured as a closed system such that the cutting strand and the guide unit are connected in such a way that the cutting strand and the guide unit can only be separated from each other with the assistance of separating tools.

3. The machine tool separating device as claimed in claim 1, wherein the cutting strand, as seen along the direction running at least substantially perpendicular to the cutting plane of the cutting strand, has a maximum dimension between 1.3 mm and 2.2 mm.

4. The machine tool separating device as claimed in claim 1, wherein the guide unit has together with the cutting strand, as seen along a direction running at least substantially parallel to the cutting plane of the cutting strand and at least substantially perpendicular to a main extension direction of the guide unit, a maximum dimension which is smaller than 50 mm.

5. The machine tool separating device as claimed in claim 1, wherein the cutting element ends at least substantially flush with at least one outer surface of the guide unit in a mounted state along the direction running at least substantially perpendicular to the cutting plane of the cutting strand.

6. A machine tool separating device, comprising:
   at least one cutting strand; and
   at least one guide unit configured to guide the at least one cutting strand,
   wherein the cutting strand, as seen along a direction running at least substantially perpendicular to a cutting plane of the cutting strand, has a maximum dimension smaller than 4 mm, and
   wherein the cutting strand has at least three blade carrier elements which are connected to one another in an articulated manner by at least two connecting elements of the cutting strand, the connecting elements having a relative distance to one another along a cutting direction of the cutting strand which is smaller than 5 mm with respect to central axes of the connecting elements.

7. A machine tool separating device, comprising:
   at least one cutting strand; and
   at least one guide unit configured to guide the at least one cutting strand,
   wherein the cutting strand, as seen along a direction running at least substantially perpendicular to a cutting plane of the cutting strand, has a maximum dimension smaller than 4 mm, and
   wherein a total mass of the device is less than 500 g.

8. A portable machine tool, comprising:
   a machine tool separating device; and
   a coupling device configured to lockingly couple to the machine tool separating device, the machine tool separating device including:
   at least one cutting strand; and
   at least one guide unit configured to guide the at least one cutting strand,
   wherein the cutting strand, as seen along a direction running at least substantially perpendicular to a cutting plane of the cutting strand, has a maximum dimension smaller than 4 mm, and
   wherein the cutting strand has at least three blade carrier elements which are connected to one another in an articulated manner by at least two connecting elements of the cutting strand, the connecting elements having a relative distance to one another along a cutting direction of the cutting strand which is smaller than 5 mm with respect to central axes of the connecting elements.

9. The portable machine tool as claimed in claim 8, further comprising at least one drive unit configured to drive the cutting strand in at least one operating state with a cutting speed of less than 6 m/s.

10. The machine tool separating device as claimed in claim 1, wherein the machine tool separating device is configured as a manual machine tool separating device.

11. The machine tool separating device as claimed in claim 6, wherein the cutting strand and the guide unit are configured as a closed system such that the cutting strand and the guide unit are connected in such a way that the cutting strand and the guide unit can only be separated from each other with the assistance of separating tools.

12. The machine tool separating device as claimed in claim 6, wherein the cutting strand, as seen along the direction running at least substantially perpendicular to the cutting plane of the cutting strand, has a maximum dimension between 1.3 mm and 2.2 mm.

13. The machine tool separating device as claimed in claim 6, wherein the guide unit has together with the cutting strand, as seen along a direction running at least substantially parallel to the cutting plane of the cutting strand and at least substantially perpendicular to a main extension direction of the guide unit, a maximum dimension which is smaller than 50 mm.

14. The machine tool separating device as claimed in claim 6, wherein the machine tool separating device is configured as a manual machine tool separating device.

15. The machine tool separating device as claimed in claim 7, wherein the cutting strand and the guide unit are configured as a closed system such that the cutting strand and the guide unit are connected in such a way that the cutting strand and the guide unit can only be separated from each other with the assistance of separating tools.

16. The machine tool separating device as claimed in claim 7, wherein the cutting strand, as seen along the direction running at least substantially perpendicular to the cutting plane of the cutting strand, has a maximum dimension between 1.3 mm and 2.2 mm.

17. The machine tool separating device as claimed in claim 7, wherein the guide unit has together with the cutting strand, as seen along a direction running at least substantially parallel to the cutting plane of the cutting strand and at least substantially perpendicular to a main extension direction of the guide unit, a maximum dimension which is smaller than 50 mm.

18. The portable machine tool as claimed in claim 8, wherein the cutting strand and the guide unit are configured as a closed system such that the cutting strand and the guide unit are connected in such a way that the cutting strand and the guide unit can only be separated from each other with the assistance of separating tools.

19. The portable machine tool as claimed in claim 8, wherein the cutting strand, as seen along the direction running at least substantially perpendicular to the cutting plane of the cutting strand, has a maximum dimension between 1.3 mm and 2.2 mm.

20. The portable machine tool as claimed in claim 8, wherein the guide unit has together with the cutting strand, as seen along a direction running at least substantially parallel to the cutting plane of the cutting strand and at least substantially perpendicular to a main extension direction of the guide unit, a maximum dimension which is smaller than 50 mm.

\* \* \* \* \*